(12) United States Patent
Shigeyama et al.

(10) Patent No.: US 7,857,163 B2
(45) Date of Patent: Dec. 28, 2010

(54) DRUG DISPENSER

(75) Inventors: Yasuhiro Shigeyama, Toyonaka (JP); Hiroyuki Kanda, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 67 days.

(21) Appl. No.: 10/531,449

(22) PCT Filed: Oct. 14, 2003

(86) PCT No.: PCT/JP03/13118

§ 371 (c)(1),
(2), (4) Date: Apr. 14, 2005

(87) PCT Pub. No.: WO2004/035436

PCT Pub. Date: Apr. 29, 2004

(65) Prior Publication Data

US 2006/0076358 A1    Apr. 13, 2006

(30) Foreign Application Priority Data

Oct. 18, 2002    (JP) ............................. 2002-305168

(51) Int. Cl.
    *B65G 59/06* (2006.01)
(52) U.S. Cl. ................. 221/209; 221/268; 221/276; 221/290; 221/292; 221/312 R; 221/224; 221/226; 221/172
(58) Field of Classification Search ............ 221/312 R, 221/1–312 C; 700/213–244
See application file for complete search history.

(56) References Cited

U.S. PATENT DOCUMENTS

| | | | | | |
|---|---|---|---|---|---|
| 3,601,237 A | * | 8/1971 | Ovsienko | ................... | 194/239 |
| 3,819,087 A | * | 6/1974 | Schuller et al. | ............. | 221/123 |
| 4,133,421 A | * | 1/1979 | Hanley et al. | ............... | 194/257 |
| 4,865,222 A | * | 9/1989 | Sullivan | ..................... | 221/241 |
| 5,335,816 A | * | 8/1994 | Kaufman et al. | ............. | 221/13 |
| 5,439,136 A | * | 8/1995 | Chatani et al. | .............. | 221/258 |
| 5,503,298 A | * | 4/1996 | Herman et al. | ................ | 221/53 |
| 5,755,551 A | * | 5/1998 | Saeki et al. | ............. | 414/797.6 |

(Continued)

FOREIGN PATENT DOCUMENTS

DE    28 54 990    11/1979

(Continued)

OTHER PUBLICATIONS

Korean Office Action (in English language) issued Sep. 10, 2010 in corresponding Korean Patent Application No. 10-2005-7006299.

*Primary Examiner*—Gene Crawford
*Assistant Examiner*—Michael K Collins
(74) *Attorney, Agent, or Firm*—Wenderoth, Lind & Ponack, L.L.P.

(57) ABSTRACT

A drug dispenser which can push a drug package in a stable state and discharge it. The drug dispenser includes a drug case (1) for containing a plurality of drug packages (100) stacked in a vertical direction, each of the plurality of drug packages (100) is packed in a rectangular package with a flange (100*a*), and a pushing mechanism (3) for pushing out the lowermost drug package (100) in a horizontal direction. A guide member (35) for supporting and guiding the flange (100*a'*) of the second drug package (100'), when the lowermost drug package (100) is pushed out, is provided in a pushing direction of the drug package (100).

14 Claims, 9 Drawing Sheets

U.S. PATENT DOCUMENTS

| | | | |
|---|---|---|---|
| 6,170,230 B1 * | 1/2001 | Chudy et al. | 53/168 |
| 6,422,417 B1 * | 7/2002 | Rawlins | 221/124 |
| 6,651,841 B2 * | 11/2003 | Tsuchida | 221/251 |
| 6,758,370 B2 * | 7/2004 | Cooke et al. | 221/194 |
| 6,789,996 B2 * | 9/2004 | Yuyama et al. | 414/798.1 |

FOREIGN PATENT DOCUMENTS

| | | |
|---|---|---|
| GB | 2 019 821 | 11/1979 |
| IT | 1105891 | 11/1985 |
| JP | 54-144676 | 11/1979 |
| JP | 3-48143 | 3/1991 |
| JP | 2001-28074 | 1/2001 |
| KR | 1998-080659 | 11/1998 |

* cited by examiner (a)

(b)

(c)

(a)

(b)

(a)

(b)

(c)

DRUG DISPENSER

BACKGROUND OF THE INVENTION

1. Field of the Invention

The present invention relates to a drug dispenser.

2. Description of the Related Art

Conventionally, in a drug dispenser for dispensing packed drugs with a flange 100a or 101a such as blister packs 100 as shown in FIG. 10 and heat tablets 101 as shown in FIG. 11 at the request of a pharmacist, a plurality of drug cases are stacked in the drug case in a vertical direction so that the lowermost drug can be pushed out in a horizontal direction by a pushing mechanism to dispense it.

In this kind of drug dispenser, as shown in FIG. 9, when pushing out the lowermost drug pack 100 on rails 102 by means of a drug pushing claw 103, the bottom corner portion of the second drug pack 100' positioned at the upstream side of a pushing direction drops on the rails 102, causing a state in which the second drug pack 100' rides on the lowermost drug pack 100 with a fulcrum C at the bottom corner portion while the lowermost drug pack 100 is pushed out. In this state, because the center of gravity G of the second drug pack 100' is higher than the fulcrum C, the second drug pack 100' hardly falls down horizontally. Moreover, the load of the drugs above the third drug pack 100" acts on a portion of the second drug pack 100' at the upstream side of the pushing direction. As a result, even if the lowermost drug pack 100 has been pushed out, the second drug pack 100' may remain in a state where the end portion thereof at the downstream side of the pushing direction rises up. Thus, there has been a disadvantage that the second drug pack 100' may clog a discharge port when pushing out the second drug pack 100'.

SUMMARY OF THE INVENTION

In view of the disadvantages of the prior art drug dispensers described above, the object of the present invention is to provide a drug dispenser which can push the drug in a stable state and discharge it.

As a means for achieving the object, the present invention provides a drug dispenser comprising a drug case for containing a plurality of drugs stacked in a vertical direction with a flange directed toward, each of the plurality of drugs being packed in a rectangular package with the flange, and a pushing mechanism for pushing out the lowermost drug in a horizontal direction. A guide member is provided for supporting and guiding the flange of the second drug when the lowermost drug being pushed out is provided in a pushing direction of the drug.

In the present invention having the means described above, when pushing out the lowermost drug package, the flange of the second drug package on the upstream side of the pushing direction drops on the support member and is supported, thereby causing a state in which the second drug package rides on the lowermost drug with a fulcrum made on the flange while the lowermost drug package, is being pushed out. In this state, as the center of gravity of the second drug package is substantially the same as or lower than the fulcrum, the second drug package is apt to fall down horizontally. Therefore, when the lowermost drug package has been pushed out, the second drug package falls down horizontally and the flange of the drug package is supported by the guide member. Thus, the second drug can be pushed out in a stable state and discharged.

Preferably, the guide member may be provided on at least any one side of the both sides of the pushing direction of the drug package.

The guide member can be extended toward the downstream side of the pushing direction of the drug package.

The guide member may support and guide the flange of the drug package on the upstream side of the pushing direction of the drug package.

DETAILED DESCRIPTION OF THE PREFERRED EMBODIMENTS

Hereinafter, embodiments of the present invention will be described.

Figure 1:
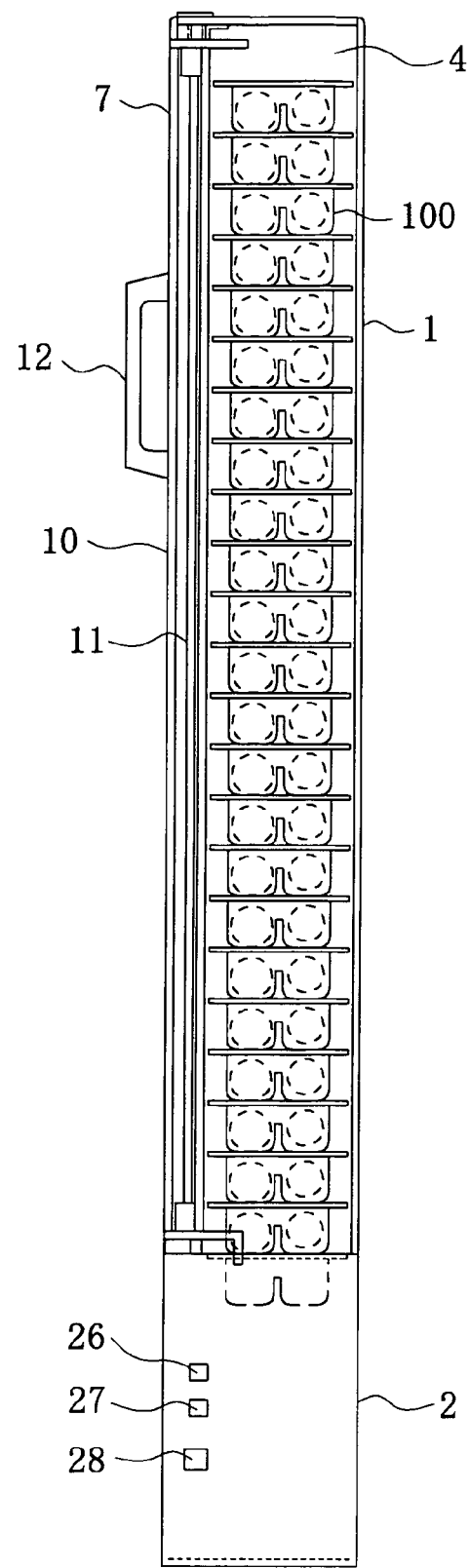
FIG. 1 is a front view of a drug dispenser according to the present invention with a door opened.
Figure 2:
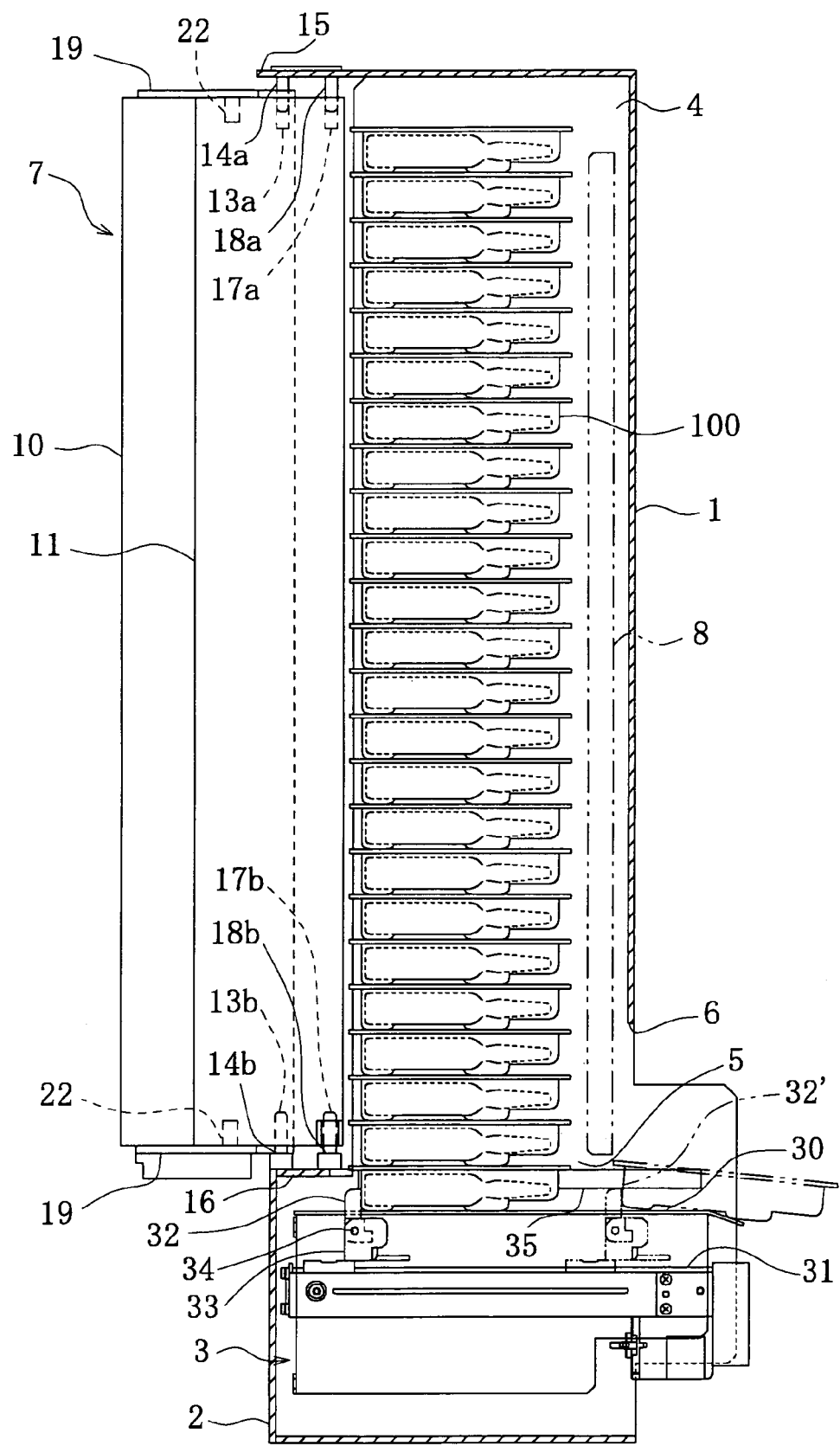
FIG. 2 is a left side view of the drug dispenser of FIG. 1.
Figure 3:
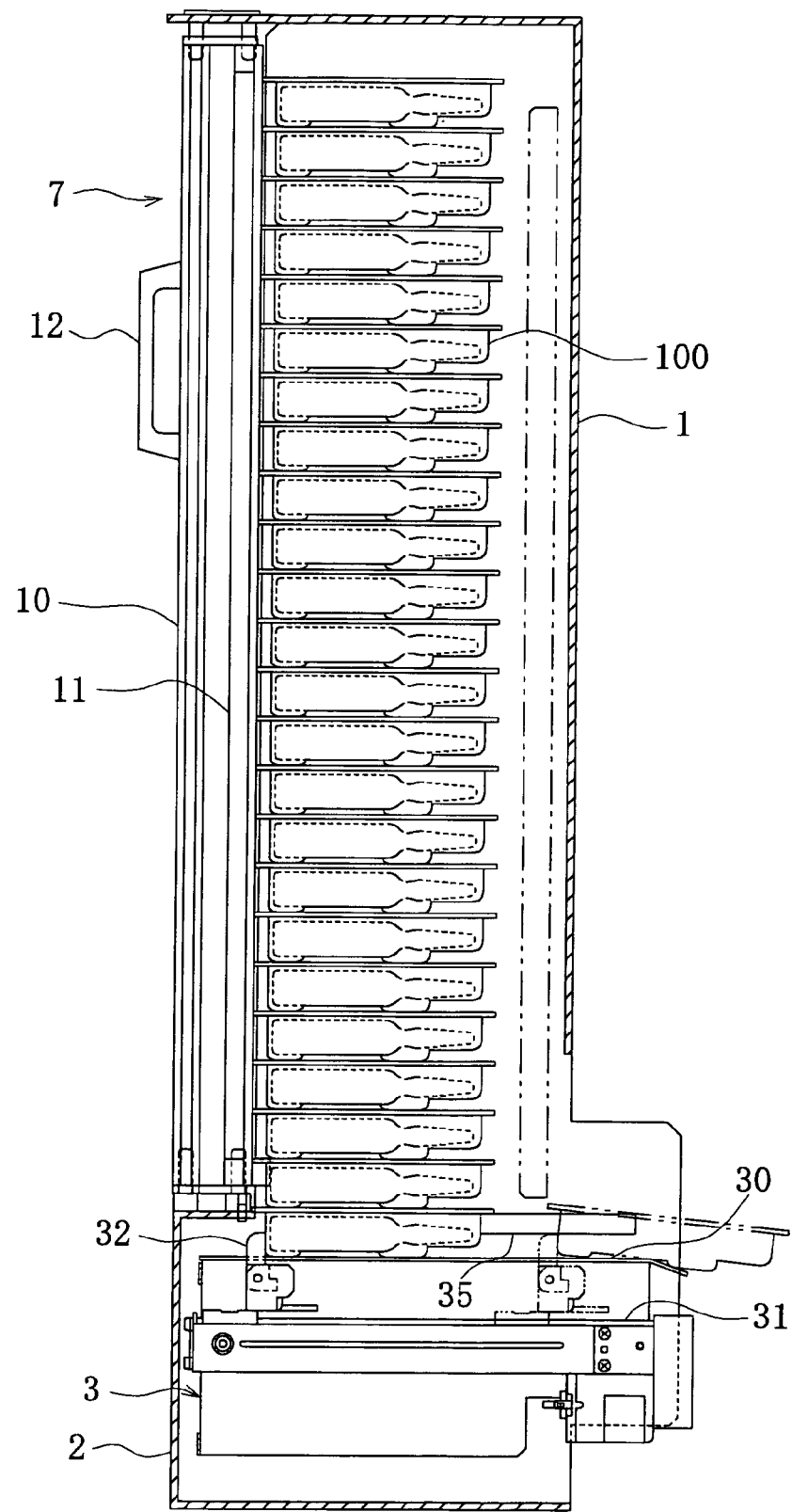
FIG. 3 is a left side view of the drug dispenser of FIG. 1 with the door closed.

FIGS. 1-3 show a drug dispenser according to the present invention. The drug dispenser has a drug case 1 and a lower case 2 integrally formed on the lower end of the drug case 1. In the lower case 2 is contained a drug pushing mechanism 3.

Figure 7:
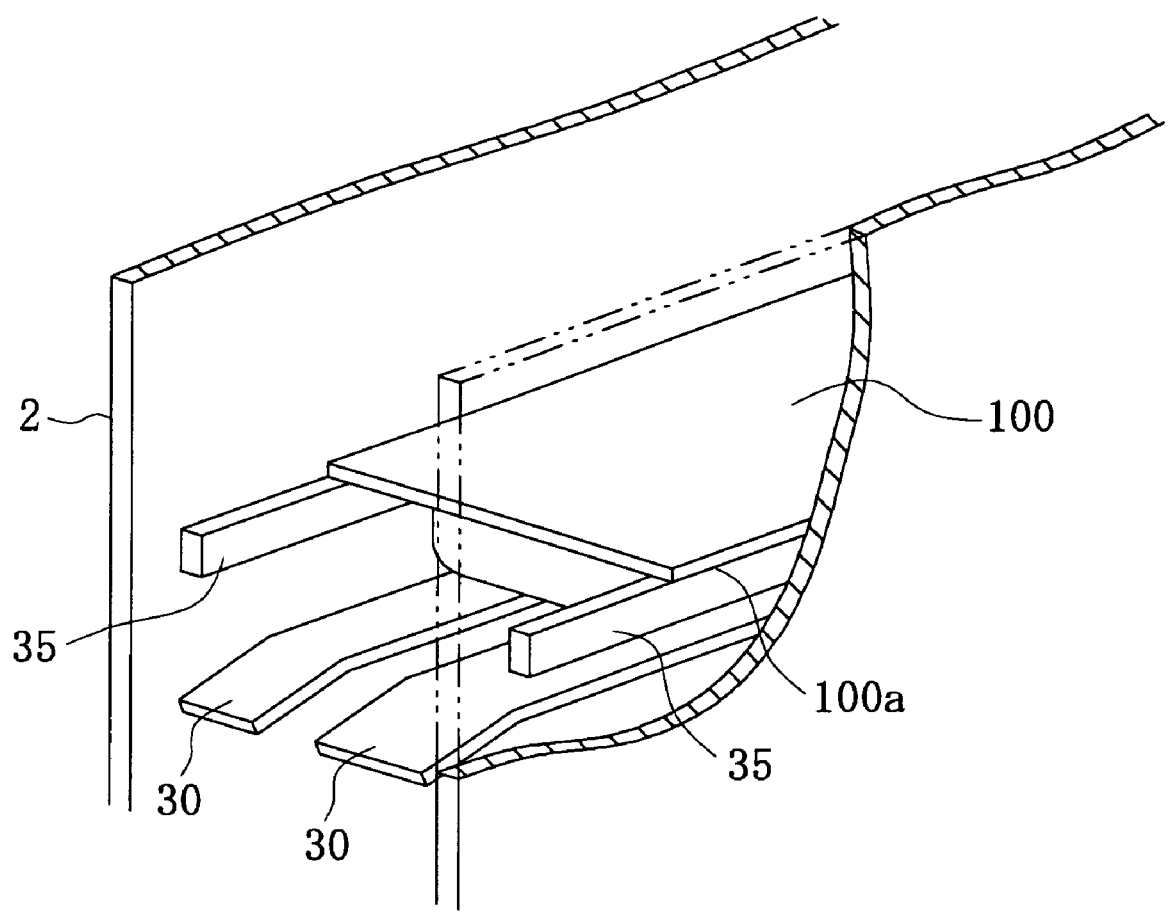
FIG. 7 is an enlarged perspective view showing a position of guide members.

The drug case 1 comprises a rectangular box which is long in a vertical direction. In the front surface, the bottom surface and the lower portion of the rear surface, openings 4, 5, 6 are formed respectively. The opening 4 of the front surface can be opened and closed by means of a door 7. In the drug case 1 of the present embodiment, a plurality of drug packages 100, each comprising a blister pack as shown in FIG. 7 are stacked and contained in a vertical direction. On the deep side within the drug case 1 is provided an alignment plate 8, the position of which is adjustable in a back and forth direction in accordance with a size of the drug package 100 to be contained. Similarly, on the left side within the drug case 1 is provided an alignment plate 9 (see FIG. 4(a)), the position of which is adjustable in a left and right direction.

The door 7, which opens and closes the opening 4 of the drug case 1, comprises a first door 10 disposed outside and a second door 11 disposed inside. A handle 12 is attached on the outer surface of the first door 10. The recessed hinge portions 13a, 13b formed on the upper and lower ends of the left side of the first door 10 are fitted into a projected hinge portion 14a projected downwardly from a protrusion piece 15 which is extended from the upper wall of the drug case 1 and a projected hinge portion 14b projected upwardly from a shelf portion 16 formed between the drug case 1 and the lower case 2 respectively so that the opening 4 of the drug case 1 can be opened and closed by substantially 90°. Similarly, the recessed hinge portions 17a, 17b formed on the upper and lower ends of the left side of the second door 11 are fitted into a projected hinge portion 18a projected downwardly from the protrusion piece 15 and a projected hinge portion 18b projected upwardly from the shelf portion 16, respectively so that the opening 4 of the drug case 1 can be opened and closed by substantially 90°.

Figure 4:
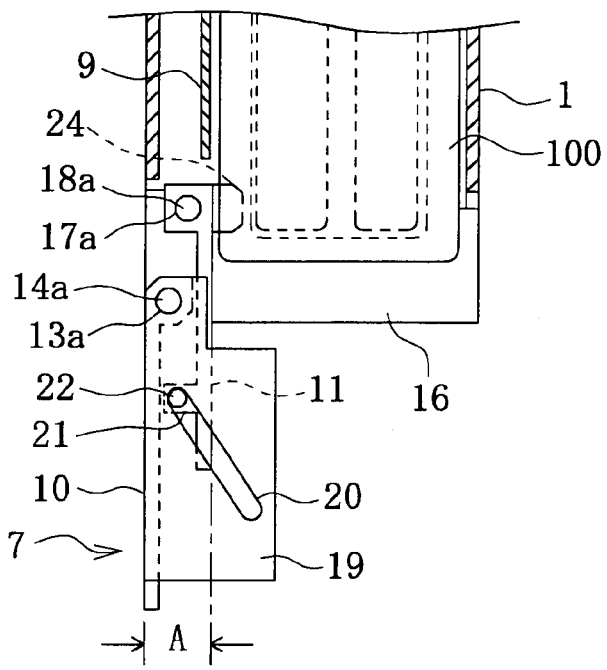
FIGS. 4(a), 4(b) and 4(c) are plan views of the drug dispenser with the door opened, with the door closing, and with the door closed, respectively.
Figure 4:
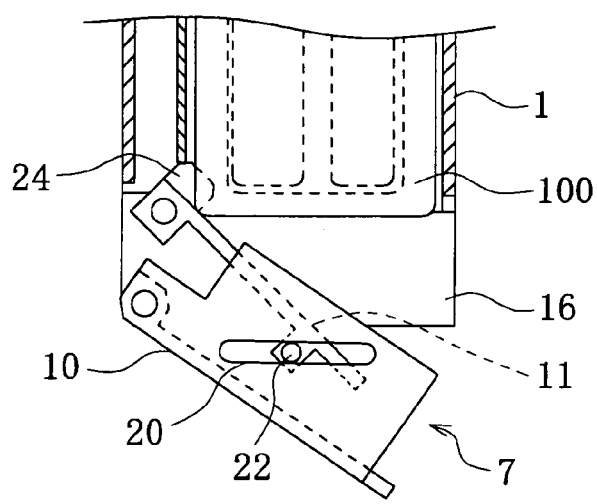
Figure 4:
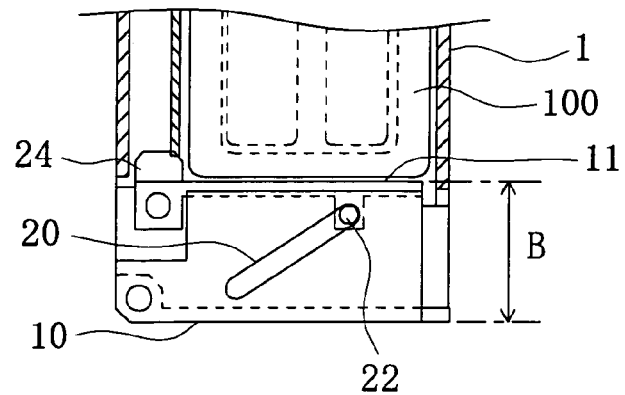

As shown in FIG. 4, the projected hinge portions 18a, 18b of the second door 11 are disposed obliquely backward on the projected hinge portions 14a, 14b of the first door 10. Thus, the distance A between the first door 10 and the second door 11 when the door 7 as shown in FIG. 4(a) is opened is smaller than the distance B between the first door 10 and the second door 11 when the door 7 is closed as shown in FIG. 4(c). As the distance A is narrow, the width of the drug case 1 can be made smaller, allowing a plurality of drug cases 1 to be disposed in a high density. Moreover, as the distance B is large, the drug packages 100 can be aligned as rearward as possible within the drug case 1 and accordingly, the drug pushing mechanism 3 can be also disposed rearwardly. Thus, the quantity of the projection of the lower case 2 from the lower end of the drug case 1 can be reduced, facilitating construction and arrangement of the apparatus.

On the upper and lower ends of the first door 10 is formed a cover plate 19 projecting toward the inside. In the cover plate 19 is formed a long aperture 20 extending obliquely from the vicinity of the projected hinge portions 13a, 13b. On the other hand, on the upper and lower ends of the second door 11 is formed a projection piece 21 so as to overlap with the cover plate 19 of the first door 10. On the projection piece 21 is formed a pin 22 which engages with the long aperture 20 of the cover plate 19 of the first door 10. The pin 22 and the long aperture 20 constitute an interlocking mechanism. When the first door 10 is opened or closed, as shown in FIGS. 4(a)-4(c), the interlocking mechanism allows the pin 22 to slide along the long aperture 20, causing the second door 11 to be opened or closed in conjunction with the first door 10.

Figure 5:
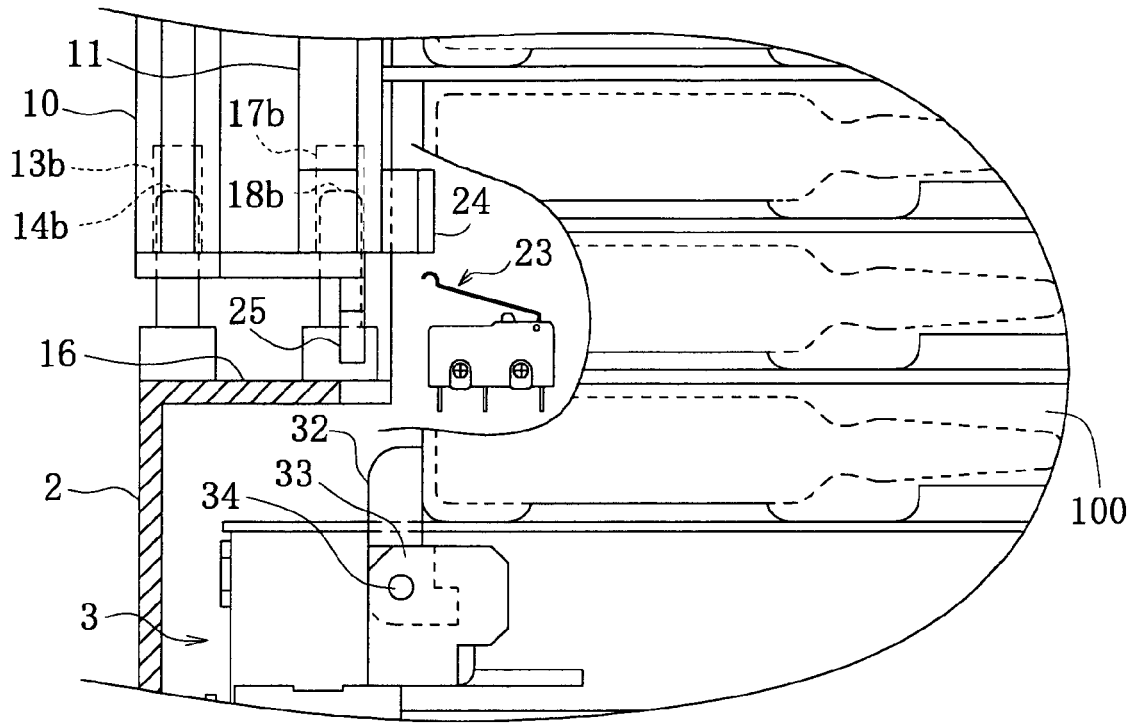
FIGS. 5(a) and 5(b) are enlarged sectional views of the bottom portion of the door in an unlocked state, in a locked state, respectively.
Figure 5:
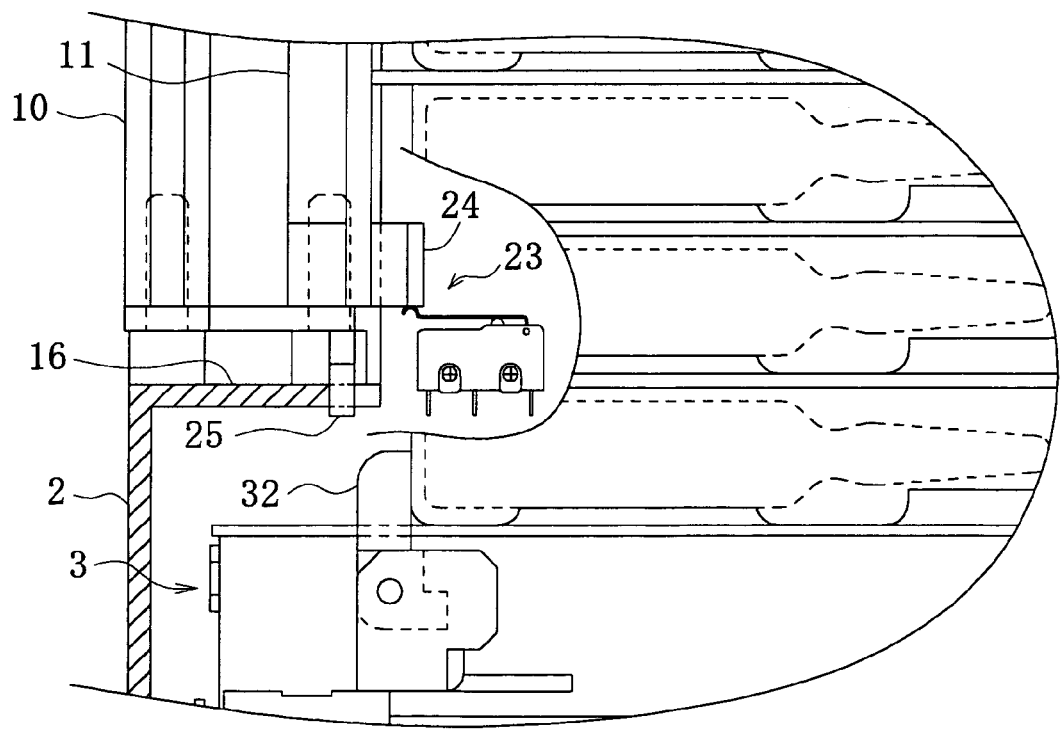

In the vicinity of the recessed hinge portion 17b, as shown in FIG. 5, is formed a protrusion 24 which pushes a closed position sensor 23 disposed in a proper position of the bottom of the drug case 1 when closing the door 7. The closed position sensor 23 comprises a microswitch. When the microswitch is ON, the drug pushing mechanism 3 which will be described hereinafter is energized to become operable.

The first door and the second door 11 are slidable within a predetermined range in a vertical direction as the recessed hinge portions 13a, 13b, 17a, 17b and the projected hinge portions 14a, 14b, 18a, 18b are fitted. In addition, a lock piece 25 extending downward is formed on the lower surface of the cover plate 19 of the lower side of the first door 10. The lock piece 25 constitutes a lock mechanism. In the lock mechanism, when the door 7 is opened by 90°, the lock piece 15 engages with the front edge of the shelf portion 16 to lock the door 7 in an opened state, and when the door 7 is closed, the lock piece 15 engages with the rear edge of the shelf portion 16 to lock the door 7 in a closed state.

On the front surface of the lower case 2, as shown in FIG. 1, there are disposed a light emitting lamp 26 for indicating shortage, a light emitting lamp 27 for indicating error and an error canceling button 28. The light emitting lamp 26 for indicating shortage is adapted to turn on when a shortage of the drug packages 100 is detected by a sensor (not shown). The light emitting lamp 27 for indicating an error is adapted to turn on when it is not in a shortage state and when the discharge of the drug package 100 is not detected by a sensor (not shown) due to clogging caused by the drug package 100 or so even if the discharge operation of the drug is conducted. The error canceling button 28 is adapted to be pushed to restart the apparatus after removing the clogged drug package 100 to cancel the error signal.

The drug pushing mechanism 3 contained in the lower case 2, as shown in FIG. 2, comprises two rails 30 on which the lowermost drug package 100 contained in the drug case 1 is rested, a screw 31 which is disposed below and extended along the rails 30 and is adapted to be driven forwardly and reversely by a motor and a pushing claw 32 which is adapted to be reciprocated along the screw 31. The pushing claw 32 is attached on a base 33 screwed on the screw 31 so that the pushing claw 32 is rotatable around a pin 34 between a standing position as shown in FIG. 2 and a laying position and is urged toward the standing position by a spring (not shown).

Figure 8:
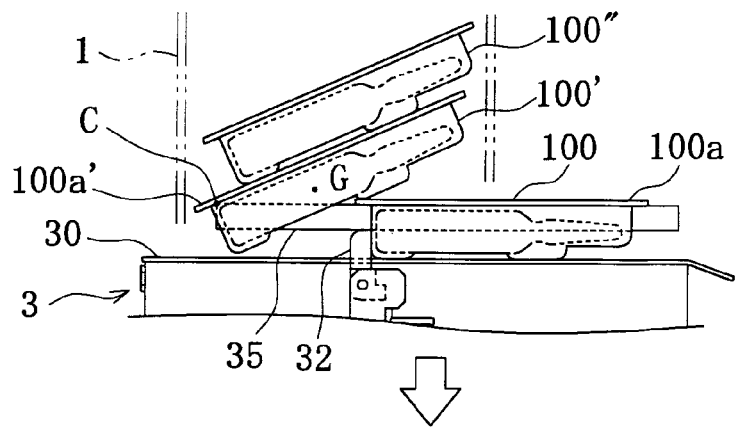
FIGS. 8(a) and 8(b) are side views showing operation of the guide members.
Figure 8:
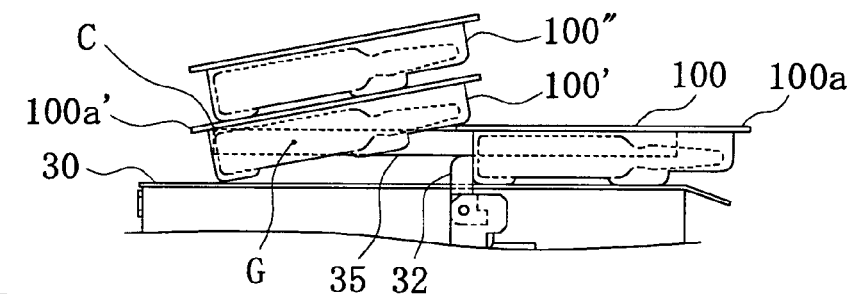
Figure 9:
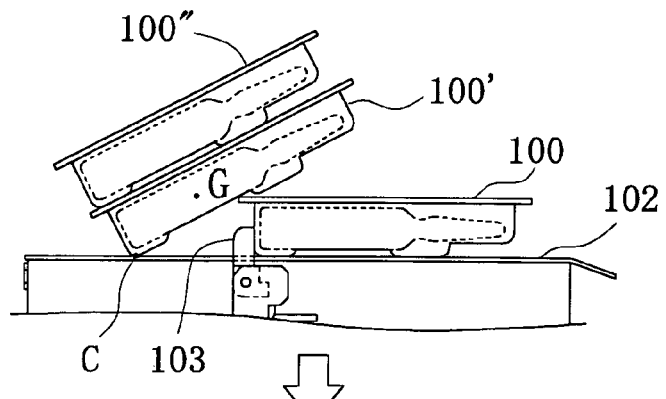
FIGS. 9(a) and 9(b) are side views showing a state of drugs being conventionally discharged.
Figure 9:
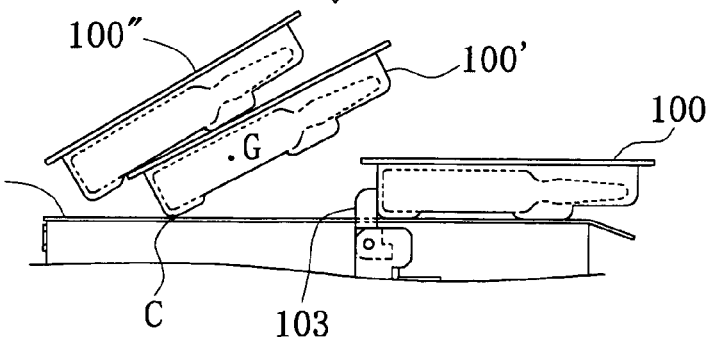

Above the rails 30, as shown in FIG. 7, a pair of guide members 35 for supporting and guiding the flange 100a of the drug package 100 are provided so as to protrude from the surfaces of the opposite side walls of the lower case 2. The pair of guide members 35 are disposed at a height so that the bottom surface of the drug package 100 does not come into contact with the rails 30 when supporting the flange 100a of the drug package 100. The pair of guide members 35, as shown in FIG. 8, function to support the flange 100a' of the drug package 100' when the upstream end of the second drug package 100', with respect to the pushing direction, falls while the lowermost drug package 100 is pushed out. Although the guide members 35 may have a minimum length capable of supporting the flange 100a' of the upstream end of the second drug package 100' with respect to the pushing direction, in the present embodiment the guide members 35 extend toward the downstream side of the pushing direction of the drug 100 to the discharge port.

One guide member 35 may be provided on one side of the pushing direction. The guide members 35 may be movable in a vertical direction so that the height of guide members 35 above the rails 30 can be adjusted based on the height of the drug package.

The drug dispensers described above having the same configuration are disposed horizontally and also disposed at a plurality of stages so that different drug packages 100 can be dispensed.

Operation of the drug dispenser having above construction will be described.

Operation for dispensing the drug packages 100 will be described first. Forward rotation of the screw 31 allows the pushing claw 32 to move rearward. The lowermost drug package 100 of the plurality of drugs stacked in the drug case 1 is pushed by the pushing claw 32, which is in a standing state at the start end position as shown by a solid line in FIG. 2, to move rearward on the rails 30. Then, the drug package 100 is pushed out and contained in a tray (not shown) to be discharged outside via a predetermined path. When the lowermost drug package 100 is pushed out, the second drug package 100 falls on the rails 30 by its own weight.

While the lowermost drug package 100 is pushed out, as shown in FIG. 8(a), the end of the second drug package 100' on the upstream side of the pushing direction drops and the flange 100a' is supported on the guide members 35. This causes a state in which the second drug package 100' rides on the lowermost drug package 100 with a fulcrum C made on the flange 100a' while the lowermost drug package 100 is pushed out. In this state, as the center of gravity G of the second drug package 100' is substantially the same as the fulcrum C, the second drug package 100' is apt to fall down horizontally. Therefore, when the lowermost drug package 100 has been pushed out completely, the second drug package 100' falls down horizontally and the flange 100a' of the drug package 100' is supported by the guide members 35. Thus, the second drug package 100' can be pushed out in a stable state and discharged.

After the lowermost drug package 100 has been pushed out, the second drug package 100' falls on the rails 30 due to its own weight. Consequently, the screw 31 is reversely rotated. This causes the pushing claw 32', which is positioned at the terminal end position as shown by a double-dashed chain line in FIG. 2, to move forward. The pushing claw 32' comes into contact with the rear end of the drug package 100 to become a laying state. Then, the pushing claw 32' passes under the drug package 100' and goes back to the start end position to become a standing state. Repeating the above operation allows the drug packages 100 to be sequentially dispensed.

In the case of a shortage of the drug packages 100, the door 7 of the drug case 1 is opened to fill the case 1 with the stacked drug packages 100. Opening of the door 7 is conducted by holding the handle 12 to slide the door 7 upward so that the engagement of the lock piece 25 with the rear end of the shelf portion 16 can be released as shown in FIG. 5(a). When opening the first door 10, the second door 11 is opened in conjunction with the first door 10. When the door 7 is opened by 90°, the lock piece 25 falls away the shelf portion 16 and slides downward to engage with the front end of the shelf portion 16, allowing the door 7 to be locked in an opened state.

When the door 7 is opened, the drug case 1 can be filled with the drug packages 100. All one has to do is just stack the drug packages 100 sequentially. It is not necessary to align the drug packages 100. When the door 7 is opened, as shown in FIG. 5(a), the protrusion 24 of the door 7 leaves the closed position sensor 23 to shut off the power to the medicine pushing mechanism 3, resulting in inability to drive. Therefore, dispensing operation of the drug package 100 is never conducted while filling the case 1 with the drug packages 100, thereby ensuring safety. Moreover, as the door 7 is locked in an opened state as described above, the door 7 is never moved while filling the case 1 with the drug packages 100, which allows the filling work to be conducted smoothly.

Figure 6:
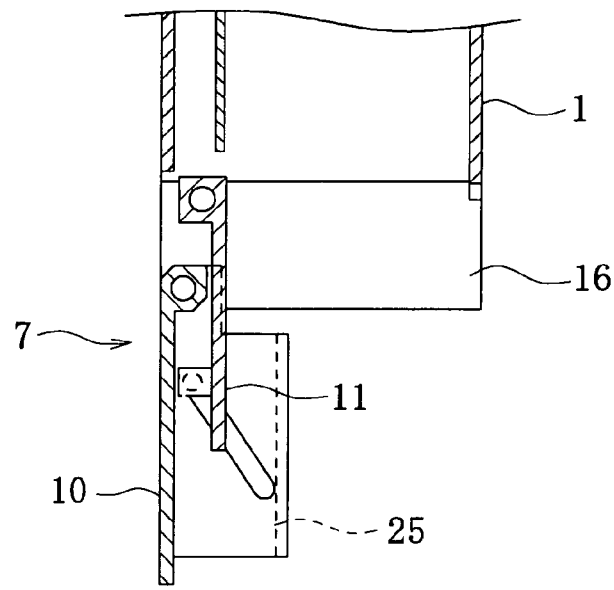
FIGS. 6(a) and 6(b) are sectional views of the door in an unlocked state, in a locked state, respectively.
FIG. 6(c) is a perspective view of the door in a locked state.
Figure 6:
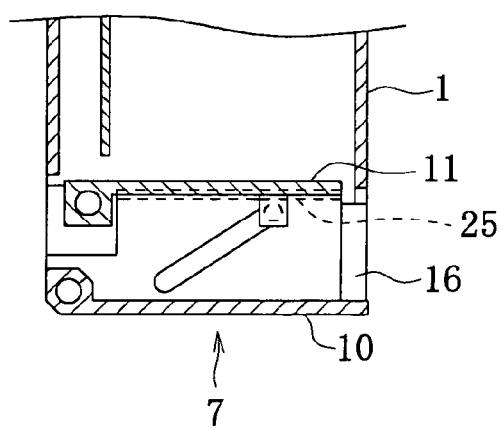
Figure 6:
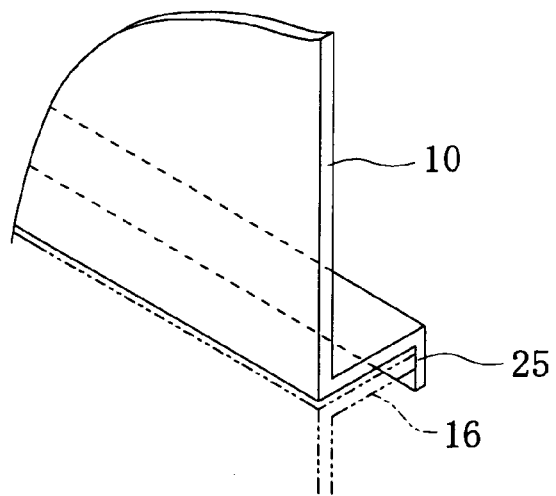

After completion of filling the drug case 1 with the drug packages 100, the door 7 is closed. Closing of the door 7 is conducted, in the same manner as in opening the door 7, by holding the handle 12 to slide the door 7 upward so that the engagement of the lock piece 25 with the front end of the shelf portion 16 can be released. When closing the first door 10, the second door 11 is closed in conjunction with the first door 10 as shown in FIGS. 4(a) to 4(c). The door 7 is closed completely, as shown in FIG. 4(c), the inner surface of the second door 11 pushes the front ends of the plurality of drug packages 100 so that the rear ends come into contact with the alignment plate 8, causing the plurality of drug packages 100 to be aligned. When pushing back the door 7, as shown in FIG. 6(b), the lock piece 25 falls away from the shelf portion 16 and slides downward to engage with the rear end of the shelf portion 16, allowing the door 7 to be locked in a closed state. When the door 7 is closed, as shown in FIG. 5(b), the protrusion 24 of the door 7 pushes the closed position sensor 23, allowing the drug pushing mechanism to drive.

Figure 10:
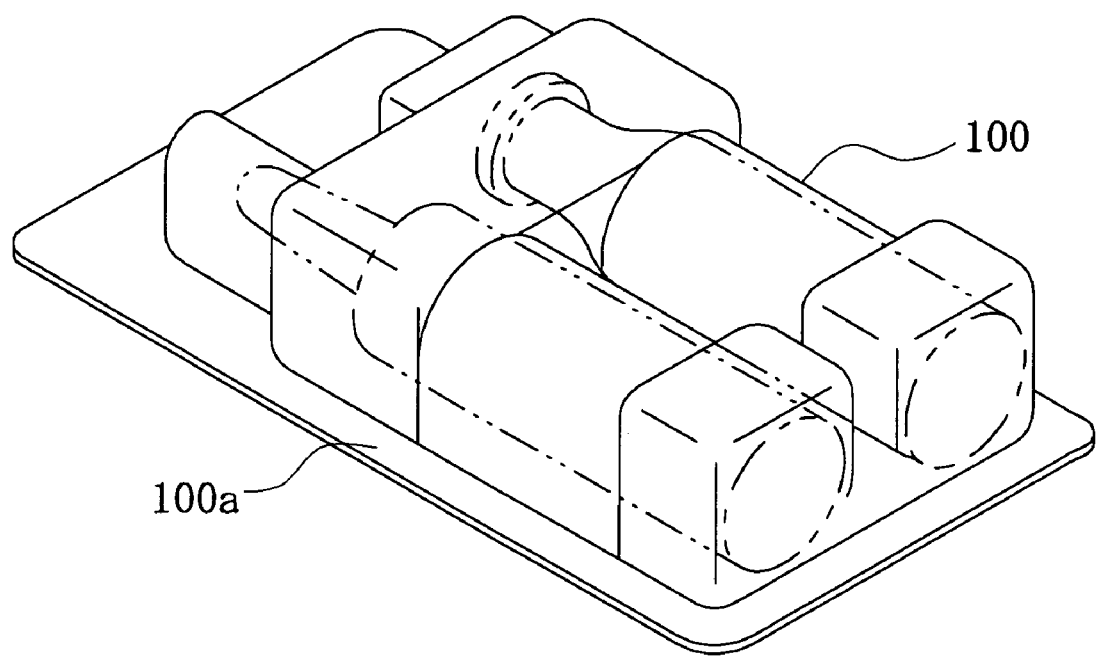
FIG. 10 is a perspective view of an example of a blister pack.
Figure 11:
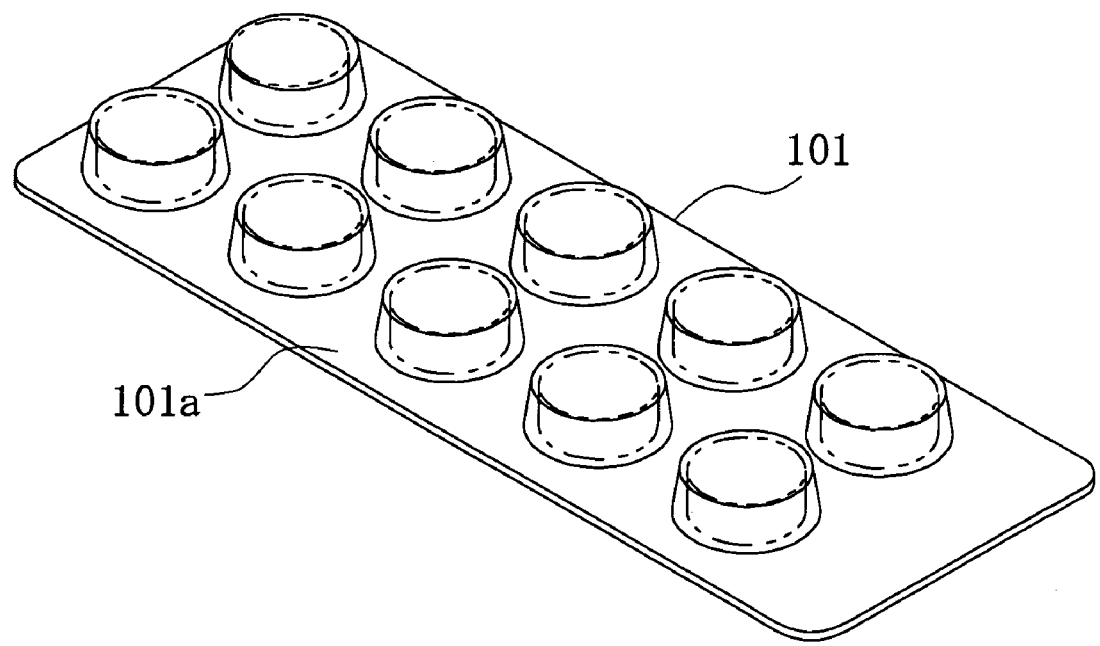
FIG. 11 is a perspective view of an example of a heat tablet.

Although the above embodiment relates to a drug dispenser for dispensing the blister packs 100 as shown in FIG. 10, the present invention can be applied to a drug dispenser for dispensing drug packs such as the heat tablets 101 shown in FIG. 11 in the same manner. If the guide members 35 are removed, it is possible to dispense box-like drug packages having no flanges.

What is claimed is:

1. A drug dispenser comprising:
   a drug case for containing a plurality of drug packages stacked in a vertical direction, each of the plurality of drug packages being a rectangular package having a flange at an upper side of the package;
   a pushing mechanism for pushing out from the drug case the lowermost drug package in a horizontal direction, the pushing mechanism including rails for supporting the lowermost drug package as it is moved in the horizontal direction by the pushing mechanism; and
   a guide member immovably fixed on an inner surface of a side wall of the drug case separately from the pushing mechanism for supporting and guiding the flanges, which extend in a pushing direction of the pushing mechanism, of both the second drug package as it descends when the lowermost drug package is being pushed out and the lowermost drug package, the guide member being provided in a pushing direction of the pushing mechanism.

2. The drug dispenser of claim 1, wherein the guide member is provided on at least one side of the pushing direction.

3. The drug dispenser of claim 1, wherein the guide member is extended toward a downstream side of the pushing direction.

4. The drug dispenser of claim 1, wherein the guide member supports and guides the flange of the drug package on an upstream side of the pushing direction.

5. A dispenser for dispensing drugs contained in a package having an upper flange, said dispenser comprising:
   an upper case for containing a plurality of the packages stacked in a vertical direction;
   a lower case connected to a lower end of said upper case;
   a pushing mechanism, disposed in said lower case, for pushing out and dispensing from the upper case the lowermost package in a horizontal pushing direction, said pushing mechanism including at least one rail for supporting the lowermost package as it is pushed out in the horizontal pushing direction; and
   at least one guide member fixedly disposed on an inner sidewall of said lower case for supporting and guiding the flange of the second lowermost package when the lowermost package is pushed out by said pushing mechanism, said guide member being fixed on said inner sidewall so as to be immovable and disposed above said pushing mechanism.

6. The dispenser of claim 5, wherein said pushing mechanism further comprises a screw disposed below and extending along the rails, and a pushing claw adapted to be driven in a forward direction and in a reverse direction upon rotation of the screw.

7. The dispenser as claimed in claim 5, wherein said at least one guide member comprises a pair of guide members disposed on opposite side walls of said lower case.

8. The dispenser as claimed in claim 6, wherein said at least one guide member comprises a pair of guide members disposed on opposite side walls of said lower case, and said guide members protrude from the side walls of said lower case and are disposed above said rails so that a bottom surface of the lowermost package will not contact the rails when supported in a horizontal position by said guide members.

9. The dispenser as claimed in claim 8, wherein said guide members function to support the flange of the second lowermost drug package when an upstream end of the second lowermost package, with respect to the pushing direction, drops due to the lowermost package being pushed out by said pushing mechanism.

10. The dispenser of claim 6, wherein said pushing claw is normally disposed in a vertical orientation and is adapted to be moved to a horizontal orientation when driven in the reverse direction.

11. A dispenser for dispensing drugs contained in a package having an upper flange, said dispenser comprising:
   a case for containing a plurality of the packages stacked in a vertical direction;
   a pushing mechanism, disposed in said case, for pushing out and dispensing from the case the lowermost package in a horizontal pushing direction, said pushing mechanism including a rail for supporting the lowermost package as it is pushed out in the horizontal pushing direction; and
   at least one guide member fixedly disposed on an inner sidewall of said case for supporting and guiding the flanges, which extend in a pushing direction of the pushing mechanism, of both the second lowermost package as it descends when the lowermost package is pushed out by said pushing mechanism and the lowermost drug package, said guide member being disposed above said pushing mechanism and fixed in said inner sidewall so as to be immovable.

12. The drug dispenser of claim 11, wherein the guide member is provided on at least one side of the pushing direction.

13. The drug dispenser of claim 11, wherein the guide member extends longitudinally toward a downstream side of the pushing direction.

14. The drug dispenser of claim 11, wherein the guide member supports and guides the flange of the drug package on an upstream side of the case relative to the pushing direction.

* * * * *